(12) United States Patent
Ready

(10) Patent No.: US 10,154,676 B1
(45) Date of Patent: Dec. 18, 2018

(54) FOOD DISPENSER

(71) Applicant: Walter Ready, Marysville, PA (US)

(72) Inventor: Walter Ready, Marysville, PA (US)

( * ) Notice: Subject to any disclaimer, the term of this patent is extended or adjusted under 35 U.S.C. 154(b) by 0 days.

(21) Appl. No.: 15/805,206

(22) Filed: Nov. 7, 2017

(51) Int. Cl.
*B05C 17/005* (2006.01)
*A23G 1/20* (2006.01)

(52) U.S. Cl.
CPC ........ *A23G 1/202* (2013.01); *B05C 17/00523* (2013.01)

(58) Field of Classification Search
CPC .......................... A23G 1/202; B05C 17/00523
USPC ............................................... 222/146.5, 391
See application file for complete search history.

(56) References Cited

U.S. PATENT DOCUMENTS

| | | | | |
|---|---|---|---|---|
| 1,630,846 | A * | 5/1927 | Holst ...................... | F16N 3/08 222/323 |
| 2,617,560 | A * | 11/1952 | Pietrzak .............. | B05C 17/0123 222/340 |
| 2,720,345 | A * | 10/1955 | Slobin ................. | B05C 17/0123 222/326 |
| 2,884,877 | A * | 5/1959 | Nalbone ............... | A21C 15/005 118/13 |
| 3,069,053 | A * | 12/1962 | Nilsson ............... | B05C 17/0123 220/298 |
| 3,197,076 | A * | 7/1965 | Chamblee .............. | A47G 19/18 126/343.5 A |
| 3,485,417 | A * | 12/1969 | Cocks ...................... | A43D 5/00 101/487 |
| 3,612,357 | A * | 10/1971 | Ruskin ................ | B05C 17/0053 219/230 |
| 3,665,158 | A * | 5/1972 | Froedge ............ | B05C 17/00523 141/82 |
| 3,744,921 | A * | 7/1973 | Weller .............. | B05C 17/00533 219/230 |
| 3,921,858 | A | 11/1975 | Bemm | |
| 4,033,484 | A * | 7/1977 | Ornsteen .......... | B05C 17/00533 222/146.5 |
| 4,065,034 | A * | 12/1977 | Callan ..................... | B05C 3/132 219/230 |
| 4,067,481 | A * | 1/1978 | Feldman ........... | B05C 17/00533 219/230 |
| 4,265,618 | A * | 5/1981 | Herskovitz .............. | A61C 5/50 219/230 |
| 4,486,149 | A * | 12/1984 | Merkel ............... | B05C 11/1042 222/146.5 |
| 4,493,972 | A * | 1/1985 | Steinel ............. | B05C 17/00546 219/230 |

(Continued)

FOREIGN PATENT DOCUMENTS

CA          2363855         11/2010

*Primary Examiner* — Patrick M Buechner
*Assistant Examiner* — Michael J Melaragno

(57) ABSTRACT

The food dispenser is a configured for use with a viscous foodstuff. The food dispenser is an extrusion device. The food dispenser extrudes the viscous foodstuff. The food dispenser is a temperature controlled device. The food dispenser maintains the viscous foodstuff at a set temperature during the extrusion of the viscous foodstuff. The food dispenser comprises a piping gun, a heating element, and a thermal control. The piping gun contains and extrudes the viscous foodstuff. The heating element heats the viscous foodstuff contained within the piping gun. The thermal control turns the heating element on and off to control the temperature of the viscous foodstuff during extrusion.

8 Claims, 5 Drawing Sheets

(56) References Cited

U.S. PATENT DOCUMENTS

| | | | | |
|---|---|---|---|---|
| 4,521,456 A * | 6/1985 | Hanson | ............... | B05C 17/002 118/410 |
| 4,526,303 A * | 7/1985 | Harrod | ............... | A61B 17/8822 222/386 |
| 4,547,658 A * | 10/1985 | Crowley | ............... | H05B 3/342 219/212 |
| 4,681,524 A * | 7/1987 | Ikeda | ............... | B05C 17/0123 222/326 |
| 4,776,490 A * | 10/1988 | Wingert | ............ | B05C 17/0053 222/146.5 |
| D307,379 S | 4/1990 | Knispel | | |
| 4,974,752 A * | 12/1990 | Sirek | ............... | B05C 17/00533 222/146.5 |
| 5,361,946 A * | 11/1994 | Ginther | ............... | A23G 3/0242 222/175 |
| 5,615,805 A * | 4/1997 | Yoncak | ............ | B05C 17/00546 219/521 |
| 5,719,378 A * | 2/1998 | Jackson, Jr. | ........ | G05D 23/1917 219/483 |
| 5,902,621 A * | 5/1999 | Beckett | ............... | A23G 1/20 426/279 |
| 5,934,521 A * | 8/1999 | Yamada | ............... | B05B 1/306 222/146.2 |
| 5,955,114 A * | 9/1999 | Llanos | ............... | G01F 11/026 222/391 |
| 6,026,985 A * | 2/2000 | Elliott, Sr. | ............ | A21C 11/18 222/1 |
| 6,065,888 A * | 5/2000 | Maayeh | ............... | B05C 17/0053 222/146.2 |
| 6,202,892 B1 * | 3/2001 | Lasko | ............... | B05C 17/0053 222/108 |
| 6,222,162 B1 * | 4/2001 | Keane | ............... | H05B 1/0272 219/212 |
| 6,355,912 B2 * | 3/2002 | Allard | ............... | H05B 1/0272 219/212 |
| 6,460,736 B1 * | 10/2002 | D'Agostino | ............ | A23G 1/202 222/146.5 |
| 6,737,610 B1 * | 5/2004 | Horn | ................ | H05B 1/0272 219/211 |
| 6,860,788 B2 | 3/2005 | Small | | |
| 7,180,037 B2 * | 2/2007 | Weiss | ................ | G01K 3/005 219/212 |
| 7,520,408 B1 * | 4/2009 | Smith | ................ | B05C 17/0053 219/200 |
| 9,320,084 B2 * | 4/2016 | Weiss | ................ | H05B 3/146 |
| 9,723,845 B2 * | 8/2017 | Fiebel | ................ | A21C 15/005 |
| 9,908,139 B2 * | 3/2018 | Hsu | ................ | B05C 17/0053 |
| 2002/0179725 A1 * | 12/2002 | Shearer | ............ | G05D 23/1902 236/78 R |
| 2004/0177817 A1 * | 9/2004 | Bradenbaugh | ........ | F24H 9/2021 122/13.01 |
| 2004/0244603 A1 * | 12/2004 | Magers | ............... | A23G 1/202 99/353 |
| 2005/0150968 A1 * | 7/2005 | Shearer | ............ | G05D 23/1902 236/94 |
| 2006/0127548 A1 | 6/2006 | Nakanishi | | |
| 2007/0007305 A1 * | 1/2007 | Becker-Weimann | ....... | B05C 17/001 222/146.5 |
| 2010/0230440 A1 * | 9/2010 | Cardea | ............. | B05C 17/00523 222/146.5 |
| 2012/0168459 A1 * | 7/2012 | D'Onofrio | .......... | B05B 11/0002 222/52 |
| 2013/0134149 A1 * | 5/2013 | Weiss | ............ | H05B 1/02 219/481 |
| 2015/0293452 A1 * | 10/2015 | Kamins | ................. | B43K 19/00 427/256 |

* cited by examiner

FOOD DISPENSER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of personal and domestic articles including kitchen equipment, more specifically, an extrusion device configured for use with food.

SUMMARY OF INVENTION

The food dispenser is a configured for use with a viscous foodstuff. The food dispenser is an extrusion device. The food dispenser extrudes the viscous foodstuff. The food dispenser is a temperature controlled device. The food dispenser maintains the viscous foodstuff at a set temperature during the extrusion of the viscous foodstuff. The food dispenser comprises a piping gun, a heating element, and a thermal control. The piping gun contains and extrudes the viscous foodstuff. The heating element heats the viscous foodstuff contained within the piping gun. The thermal control turns the heating element on and off to control the temperature of the viscous foodstuff during extrusion.

These together with additional objects, features and advantages of the food dispenser will be readily apparent to those of ordinary skill in the art upon reading the following detailed description of the presently preferred, but nonetheless illustrative, embodiments when taken in conjunction with the accompanying drawings.

In this respect, before explaining the current embodiments of the food dispenser in detail, it is to be understood that the food dispenser is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the food dispenser.

It is therefore important that the claims be regarded as including such equivalent construction insofar as they do not depart from the spirit and scope of the food dispenser. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
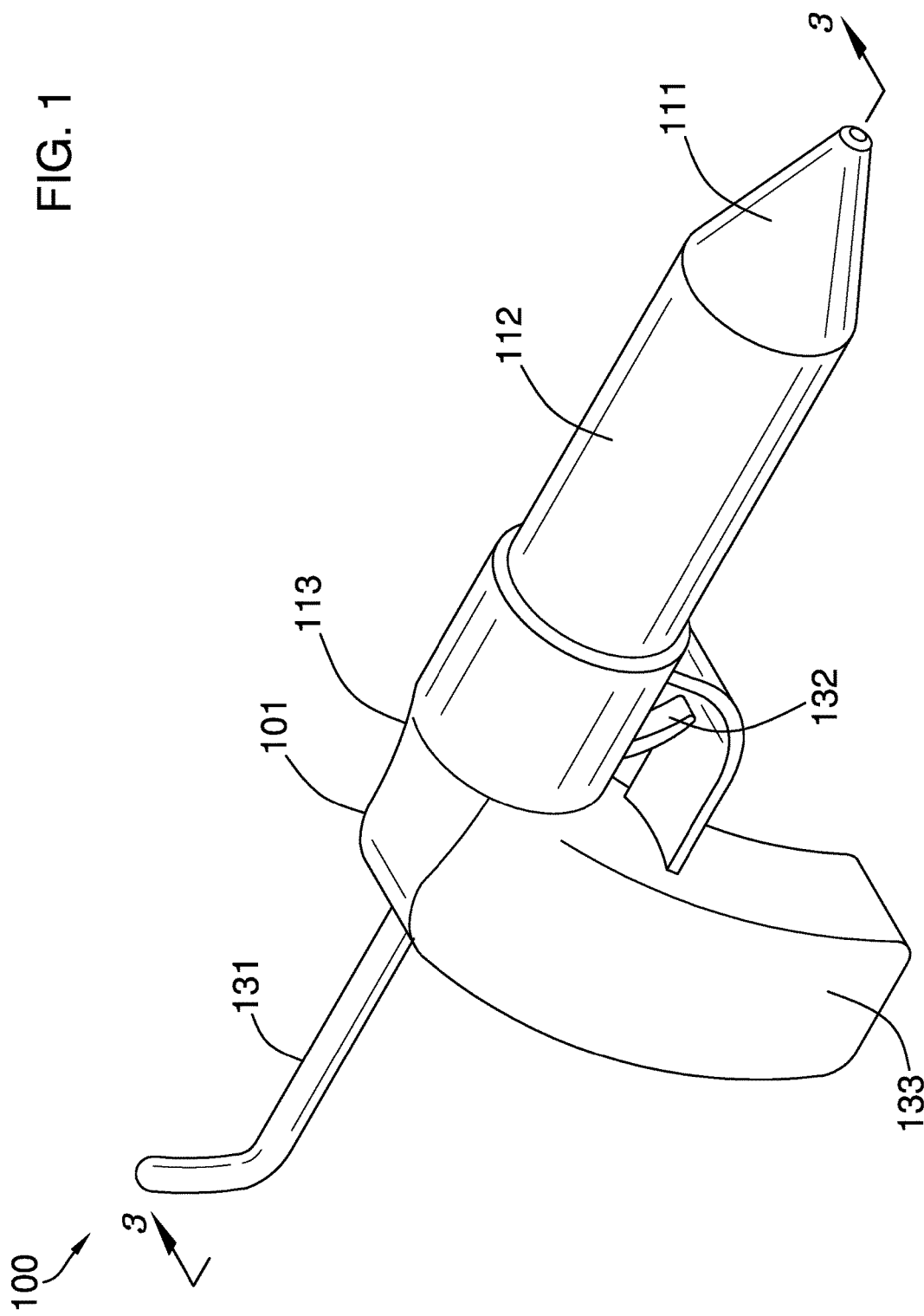
FIG. 1 is a perspective view of an embodiment of the disclosure.
Figure 2:
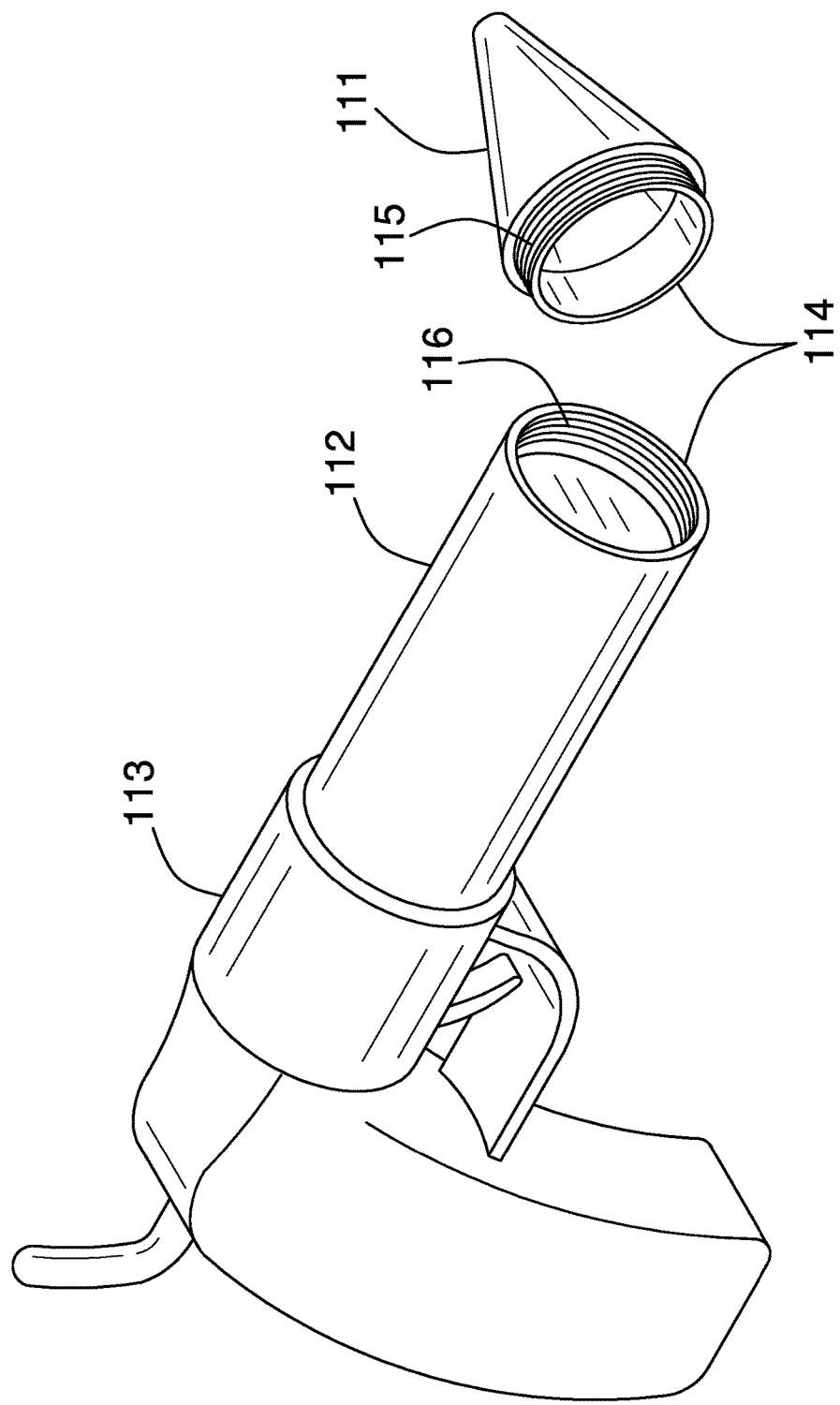
FIG. 2 is an exploded view of an embodiment of the disclosure.
Figure 3:
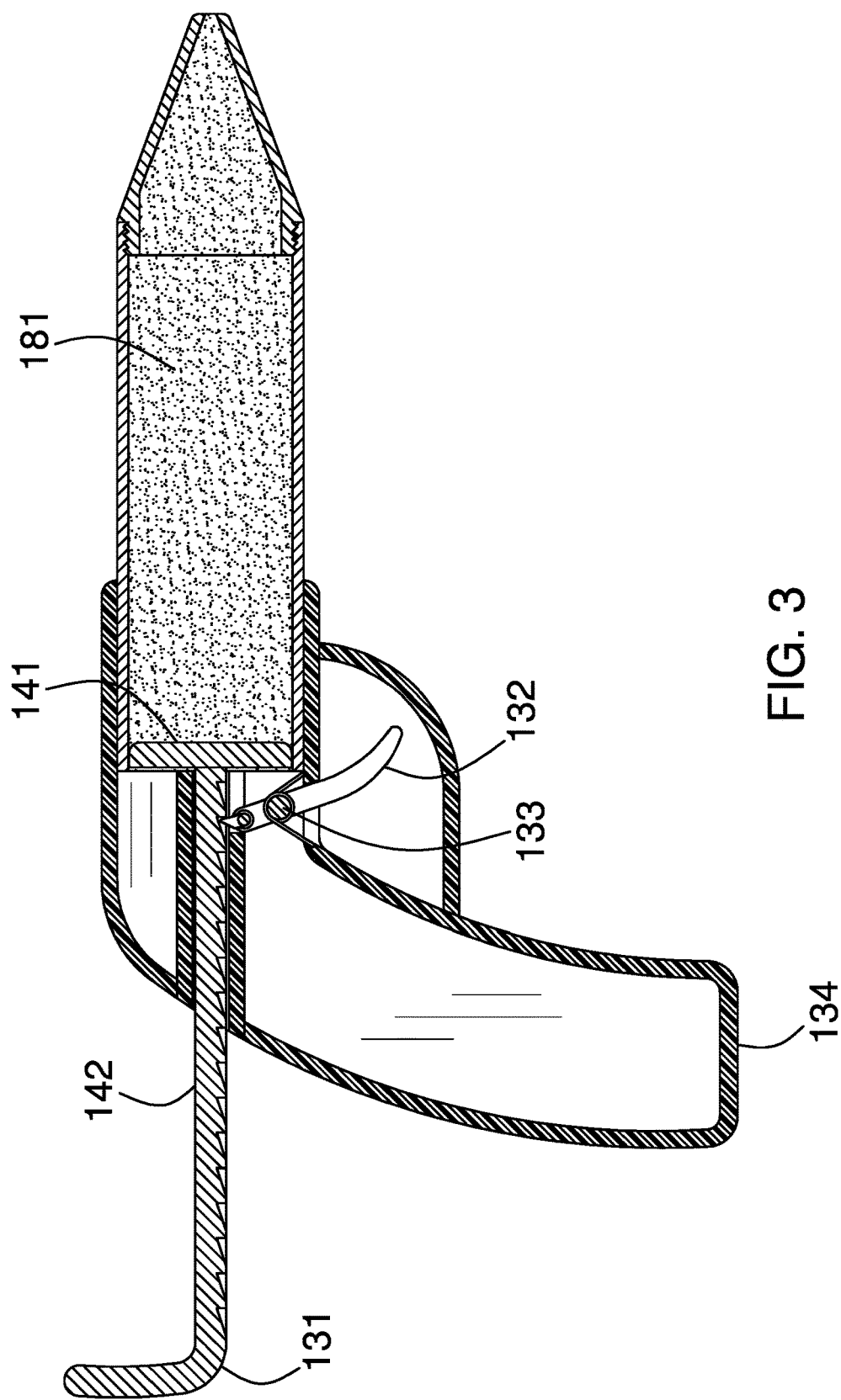
FIG. 3 is a cross-sectional view of an embodiment of the disclosure across 3-3 as shown in FIG. 1.
Figure 4:
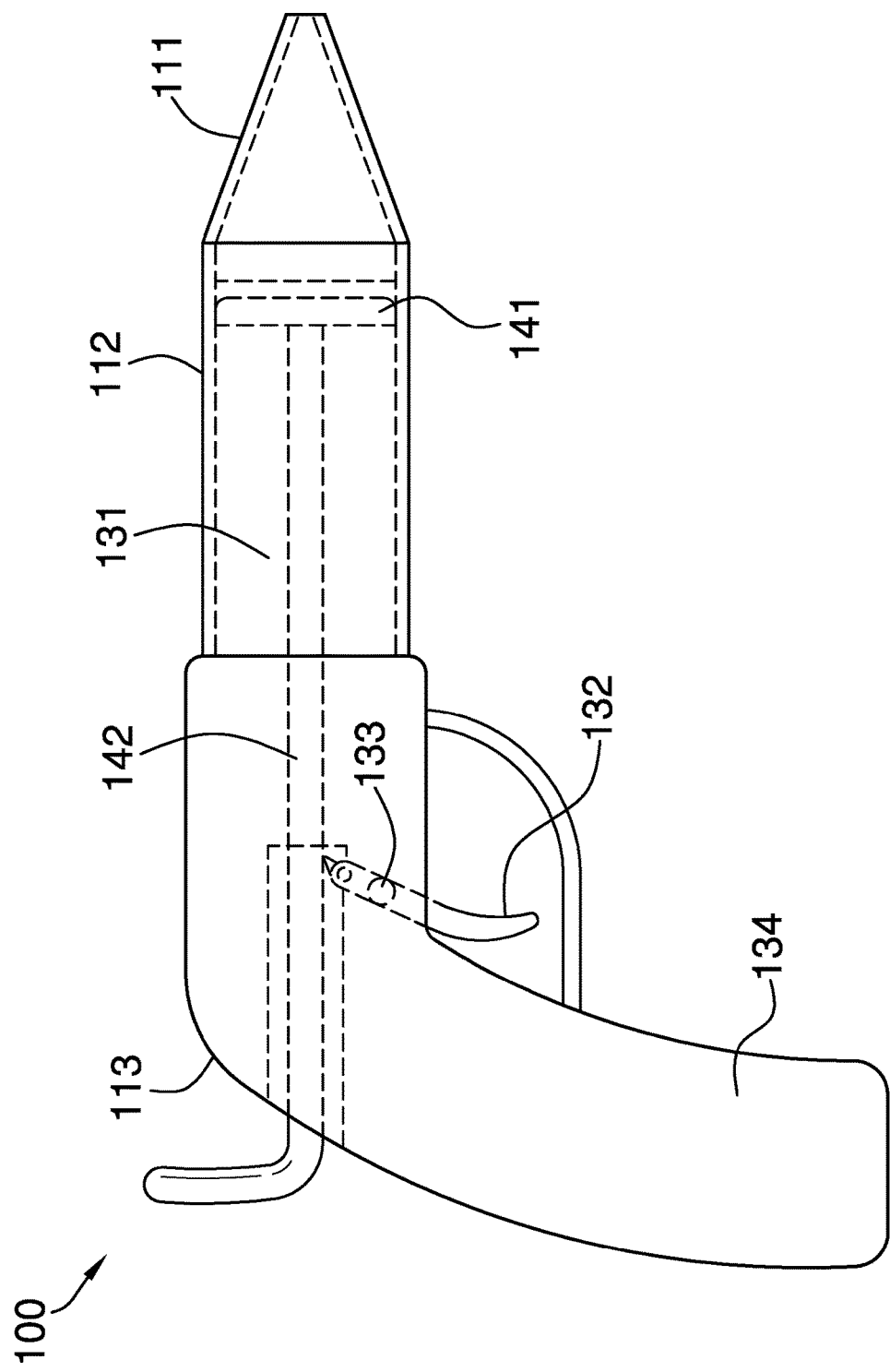
FIG. 4 is a side view of an embodiment of the disclosure.
Figure 5:
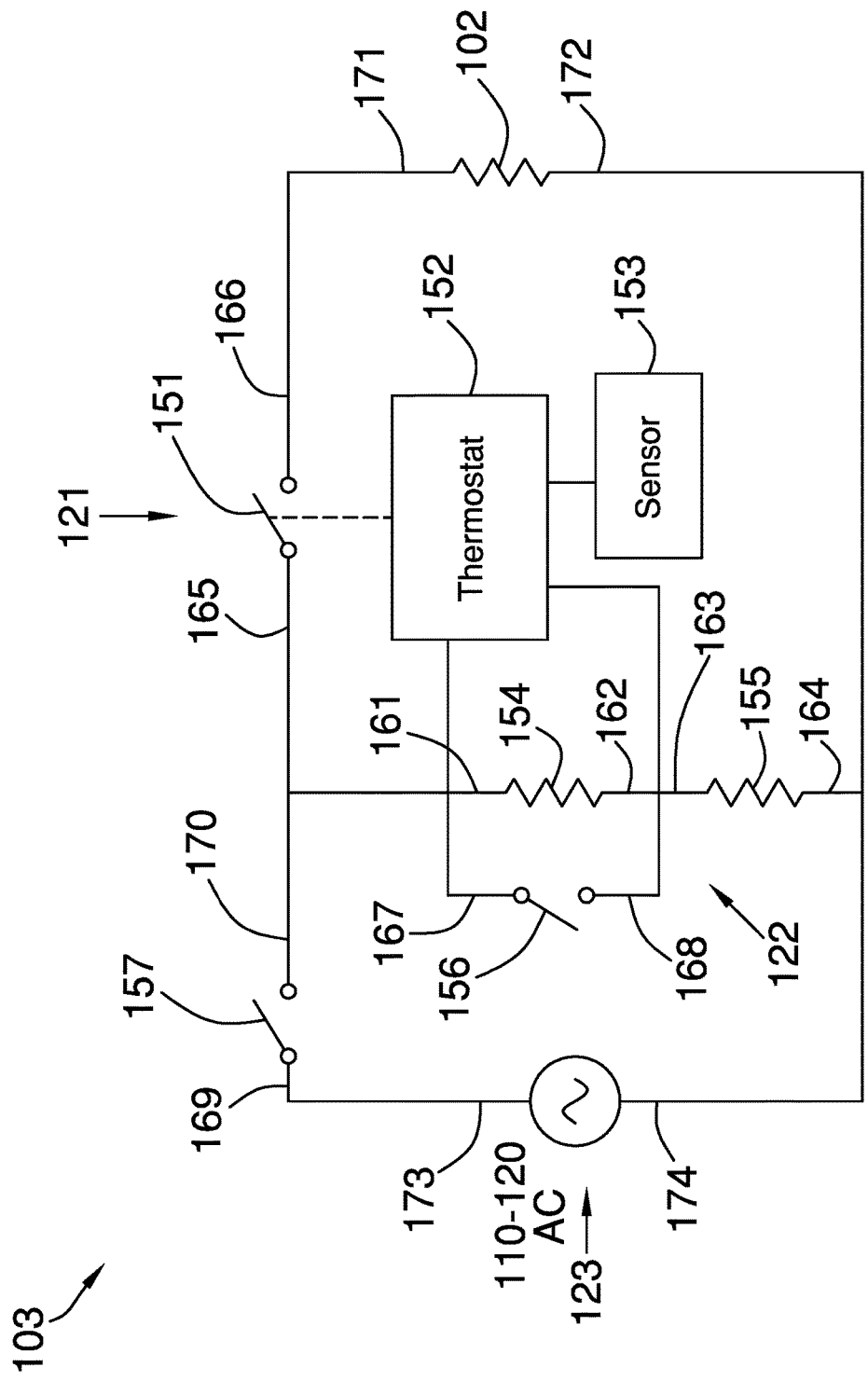
FIG. 5 is a schematic view of an embodiment of the disclosure.

Detailed reference will now be made to one or more potential embodiments of the disclosure, which are illustrated in FIGS. 1 through 5.

The food dispenser 100 (hereinafter invention) is a configured for use with a viscous foodstuff 181. The invention is an extrusion device. The invention 100 extrudes the viscous foodstuff 181. The invention 100 is a temperature controlled device. The invention 100 maintains the viscous foodstuff 181 at a set temperature during the extrusion of the viscous foodstuff 181. The invention 100 comprises a piping gun 101, a heating element 102, and a thermal control 103. The piping gun 101 contains and extrudes the viscous foodstuff 181. The heating element 102 heats the viscous foodstuff 181 contained within the piping gun 101. The thermal control 103 turns the heating element 102 on and off to control the temperature of the viscous foodstuff 181 during extrusion.

The viscous foodstuff 181 is a foodstuff selected from the group consisting of a viscous emulsion, a viscous colloid, or a gel. The viscosity of the viscous foodstuff 181 is controlled by controlling the temperature of the viscous foodstuff 181.

The invention 100 is primarily intended for use in melting and piping chocolate. Accordingly, the temperature set points of the set point circuit 122 are selected such that the chocolate will reach a temperature selected from the group consisting of a temperature that allows the chocolate to maintain its temper and a temperature that allows the chocolate to lose its temper.

The piping gun 101 is a mechanical extrusion device. The piping gun 101: 1) stores the viscous foodstuff 181; and, 2) drives the viscous foodstuff 181 through a nozzle. By changing the nozzle, the piping gun 101 forms the viscous foodstuff 181 into lines or dollops that are used for decorative or culinary purposes.

The piping gun 101 comprises a piping tip 111, a hopper 112, a drive mechanism 113, and a threaded connection 114.

The piping tip 111 is a hollow truncated cone with openings in the base and the apex of the truncated cone. The viscous foodstuff 181 is physically extruded through the piping tip 111 from the base of the piping tip 111 through the apex of the piping tip 111. The piping tip 111 forms the nozzle of the piping gun 101.

The opening at the apex of the piping tip 111 need not be circular. By modifying the perimeter of the opening at the apex of the piping tip 111 a plurality of decorative forms may be extruded through the piping tip 111. Methods to modify the apex opening of a piping tip 111 for decorative purposes are well known and documented in the food service and baking arts.

The hopper 112 is a hollow rigid cylindrical tube. The hopper 112 is the reservoir that stores the viscous foodstuff 181. The heating element 102 is installed on or within the walls of the hopper 112 such that the heating element 102 will heat the viscous foodstuff 181 stored within the hopper 112. The hopper 112 attaches the piping tip 111 to the drive mechanism 113.

The drive mechanism 113 is a piston apparatus that that drives the viscous foodstuff 181 out of the hopper 112 through the piping tip 111. In the first potential embodiment of the disclosure, the drive mechanism 113 is manually operated. The drive mechanism 113 comprises a plunger 131, a pawl 132, a handle 133, and a pivot point 134.

The pawl 132 is a lever that moves the plunger 131 through the hopper 112. The handle 133 is a grip is used to hold the piping gun 101. In the first potential embodiment of the disclosure, the thermal control 103 resides within the handle 133. The pivot point 134 is a shaft that attaches the pawl 132 to the handle 133. The pivot point 134 forms a center of rotation around which the pawl 132 rotates.

The plunger 131 acts as the piston of the drive mechanism 113. The plunger 131 comprises a drive disk 141 and a ratchet stem 142. The drive disk 141 is a disk that forms the actual piston of the drive mechanism 113. The drive disk 141 is sized such that the drive disk 141 closely fits the interior surface of the hopper 112. The drive disk 141 is positioned such that the face of the drive disk 141 is perpendicular to the center axis of the hopper 112.

The ratchet stem 142 is a shaft that attaches to the surface of the drive disk 141 that is distal from the piping tip 111. The center axis of the ratchet stem 142 is aligned with the center of the drive disk 141 and the center axis of the piping tip 111 when the plunger 131 is properly installed within the hopper 112. As shown most clearly in FIG. 3, the ratchet stem 142 is a toothed bar upon which the pawl 132 catches to form the ratchet. The movement of the pawl 132 forces the ratchet stem 142 and the drive disk 141 into the hopper 112 thereby forcing the viscous foodstuff 181 through the piping tip 111. Methods to form ratchets in this manner are well-known in the mechanical arts. Methods to release ratchets are well-known and documented in the mechanical arts.

The threaded connection 114 is a well-known and documented fastening mechanism that removably attaches the piping tip 111 to the hopper 112. The threaded connection 114 comprises an exterior screw thread 115 and an interior screw thread 116. The exterior screw thread 115 is a hollow cylindrical structure further formed with an exterior screw thread 115 that is attached to the base of the piping tip 111. The interior screw thread 116 is an interior screw thread 116 formed on the interior surface of the hopper 112. The exterior screw thread 115 is sized to fit into the interior screw thread 116.

The heating element 102 is a commercially available resistive wire installed in the hopper 112. The heating element generates heat when an electric current passes through the heating element 102. The heating element 102 heats the viscous foodstuff 181 while the viscous foodstuff 181 is in the piping gun 101. The purpose of the heating element 102 is to maintain the viscous foodstuff 181 at a temperature that maintains the viscous foodstuff 181 at the proper viscosity for extrusion. The heating element 102 is further defined with an eleventh lead 171 and a twelfth lead 172.

The thermal control 103 is an electrical circuit. The thermal control 103: 1) monitors the temperature of the viscous foodstuff 181; and, 2) based on the measured temperature energizes and de-energizes the heating element 102 such that the viscous foodstuff 181 maintains an appropriated temperature. The thermal control 103 has an adjustable temperature set point. The thermal control 103 allows for the selection of the maintained temperature of the viscous foodstuff 181. The thermal control 103 comprises a thermostat 121, a set point circuit 122, and a power source 123.

In the first potential embodiment of the disclosure, the thermal control 103 allows for a selection between two temperature set points. The temperature set point is selected from the group consisting of: 1) a temperature that allows chocolate to maintain its temper; and, 2) a temperature that heats chocolate to the point where it loses its temper.

The thermostat 121 is a well-known and commercially available device that enables and disables the operation of the heating element 102 based on the temperature of the viscous foodstuff 181. By controlling the heating element 102 in this manner, the thermostat 121 controls the temperature of the viscous foodstuff 181 stored in the hopper 112. The thermostat 121 comprises a thermostat switch 151, a feedback circuit 152, and a temperature sensor 153. The thermostat switch 151 is further defined with a fifth lead 165 and a sixth lead 166.

The set point circuit 122 is an electrical circuit that indicates the desired storage temperature of the viscous foodstuff 181. The set point circuit 122 provides a reference voltage that provides the thermostat 121 with the targeted temperature for the viscous foodstuff 181. The set point circuit 122 comprises a first resistor 154, a second resistor 155, a selection switch 156, and a master switch 157. The first resistor 154 is further defined with a first lead 161 and a second lead 162. The second resistor 155 is further defined with a third lead 163 and a fourth lead 164. The selection switch 156 is further defined with a seventh lead 167 and an eighth lead 168. The master switch 157 is further defined with a ninth lead 169 and a tenth lead 170.

The power source 123 is a source of electrical energy that is used to power the thermal control 103. In the first potential embodiment of the disclosure, the power source 123 is a 110 V-120 V AC power source. The power source 123 is further defined with a positive terminal 173 and a negative terminal 174.

The thermostat switch 151 is an electrical switch that is controlled by the thermostat 121. The thermostat switch 151 is placed in series between the power source 123 and the heating element 102. The thermostat switch 151 controls the flow of electricity through the heating element 102.

The feedback circuit 152 is an electrical circuit contained within the thermostat 121. The feedback circuit 152 compares the temperature of the viscous foodstuff 181 to the target temperature indicated by the set point circuit 122. If the temperature of the viscous foodstuff 181 falls below the target temperature determined by the set point circuit 122, the feedback circuit 152 closes the thermostat switch 151 to activate the heating element 102.

The temperature sensor 153 is an electrical sensor that measures the temperature of the viscous foodstuff 181 stored within the hopper 112. The temperature sensor 153 converts the measured temperature of the viscous foodstuff 181 into a voltage that is compared against the set point voltage generated by the set point circuit 122.

The first resistor 154 is a well-known and documented two terminal electrical device. The second resistor 155 is a well-known and documented two terminal electrical device. The first resistor 154 and the second resistor 155 combine to form a well-known and documented electrical circuit configuration known as a voltage divider. The set point voltage generated by the feedback circuit 152 is measured at the electrical connection of the first resistor 154 and the second resistor 155.

The selection switch 156 is a maintained switch that is wired in parallel to the first resistor 154. The set point voltage generated by the set point circuit 122 is changed using the selection switch 156. Specifically, the selection switch 156 changes the voltage presented across the second resistor 155 by shorting out the first resistor 154 of the voltage divider.

The master switch 157 is a maintained switch placed in series between the power source 123 both the thermostat 121 and the set point circuit 122. The master switch 157 controls the flow of electricity from the power source 123 into the balance of the thermal control 103. The master switch 157 is effectively the on-off switch of the invention 100.

The following three paragraphs describe the assembly of the invention 100.

The positive terminal 173 of the power source 123 electrically connects to the ninth lead 169 of the master switch 157. The tenth lead 170 of the master switch 157 electrically connects to the fifth lead 165 of the thermostat switch 151. The tenth lead 170 of the master switch 157 electrically connects to the seventh lead 167 of the selection switch 156. The tenth lead 170 of the master switch 157 electrically connects to the first lead 161 of the first resistor 154. The second lead 162 of the first resistor 154 electrically connects to the feedback circuit 152. The voltage level at the second lead 162 provides the set point voltage to the feedback circuit 152. The second lead 162 of the first resistor 154 electrically connects to the third lead 163 of the second resistor 155. The eighth lead 168 of the selection switch 156 electrically connects to the third lead 163 of the second resistor 155.

The sixth lead 166 of the thermostat switch 151 electrically connects to the eleventh lead 171 of the heating element 102. The fourth lead 164 of the second resistor 155 electrically connects to the negative terminal 174 of the power source 123. The twelfth lead 172 of the heating element 102 electrically connects to the negative terminal 174 of the power source 123.

The exterior screw thread 115 attaches to the base of the truncated cone that forms the piping tip 111. The interior screw thread 116 attaches to the interior surface at the end of the hopper 112 that is distal from the plunger 131. The piping tip 111 attaches to the hopper 112 by screwing the exterior screw thread 115 into the interior screw thread 116 to form the threaded connection 114.

The following definitions were used in this disclosure:

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Colloidal Suspension: As used in this disclosure, a colloidal suspension, or colloid for short, is a heterogeneous mixture of solute particles dissolved in a solvent. The colloidal suspension is referred to as heterogeneous because the distribution of the solute particles is not uniform through the solvent, usually because of the relatively large size of the particles.

Cone: As used in this disclosure, a cone is a surface that is generated by rotating a triangle around one of the legs of the triangle. If a line that is perpendicular to the center of the base goes through the vertex of the triangle then the cone is called a right cone. A cone is a type of quadric surface. The cone is a pyramid with a circular base.

Cylinder: As used in this disclosure, a cylinder is a geometric structure defined by two identical flat and parallel ends, also commonly referred to as bases, which are circular in shape and connected with a single curved surface, referred to in this disclosure as the face. The cross section of the cylinder remains the same from one end to another. The axis of the cylinder is formed by the straight line that connects the center of each of the two identical flat and parallel ends of the cylinder. Unless otherwise stated within this disclosure, the term cylinder specifically means a right cylinder, which is defined as a cylinder wherein the curved surface perpendicularly intersects with the two identical flat and parallel ends.

Decorative: As used in this disclosure, decorative is an adjective that refers to a first object or item that is used with a second object or item of the purpose of making the second object or item more attractive. Decorative will generally, but not necessarily, implies making the second object or item more attractive visually.

Die: As used in this disclosure, a die is a device used for mechanically cutting or molding a material.

Emulsion: As used in this disclosure, an emulsion is a dispersion of droplets or miscelles of a first liquid in a second liquid in which the first liquid and second liquid are not soluble or miscible.

Exterior Screw Thread: An exterior screw thread is a ridge wrapped around the outer surface of a tube in the form of a helical structure that is used to convert rotational movement into linear movement.

Extrusion: As used in this disclosure, extrusion refers to a method of shaping a viscous material, such as a viscous colloid or a viscous emulsion, through an aperture formed in a die.

Feedback: As used in this disclosure, feedback refers to an engineered system or subsystem further comprising an "input" and an "output" wherein the difference between the output of the engineered system or subsystem and a reference is used as, or fed back into, a portion of the input of the engineered system or subsystem. Examples of feedback in engineered systems include, but are not limited to, a fluid level control device such as those typically used in a toilet tank, a cruise control in an automobile, a fly ball governor, a thermostat, and almost any electronic device that comprises an amplifier. Feedback systems in nature include, but are not limited to, thermal regulation in animals and blood clotting in animals (wherein the platelets involved in blood clotting release chemical to attract other platelets)

Foodstuff: As used in this disclosure, a foodstuff refers to an edible material used as food.

Frustum: As used in this disclosure, a frustum is a portion of a solid that lies between two parallel planes that intersect with the solid.

Gel: As used in this disclosure a gel refers to a semi-rigid colloidal dispersion of a solid within a liquid or gas.

Heating Element: As used in this disclosure, a heating element is a resistive wire that is used to convert electrical energy into heat. Common metal combinations used to form heat elements include a combination of nickel and Chromium (typical: 80/20), a combination of iron, chromium, and aluminum (typical 70/25/5), a combination of copper, nickel, iron, and manganese (typical 66/30/2/2) (use for continuously hot), or a platinum.

Interior Screw Thread: An interior screw thread is a groove that is formed around the inner surface of a tube in the form of a helical structure that is used to convert rotational movement into linear movement.

Lead: As used in this disclosure, a lead is a conductor that electrically connects an electrical component into a larger circuit assembly.

Maintained Switch: A used in this disclosure, a maintained switch is a switch that maintains the position that was set in the most recent switch actuation. A maintained switch works in an opposite manner to a momentary switch.

Pawl: As used in this disclosure, a pawl is a rotating bar or lever with a free end that engages a toothed structure.

Perimeter: As used in this disclosure, a perimeter is one or more curved or straight lines that bound an enclosed object. The perimeter of a circle is commonly referred to as a circumference.

Piston: As used in this disclosure, a piston is a disk that closely fits within a pipe or tube and that moves along the center axis of the pipe or tube. Depending on the context, a piston can also refer to the apparatus associated with the disk that allows the disk to move within the pipe or tube.

Pivot: As used in this disclosure, a pivot is a rod or shaft around which an object rotates or swings.

Potentiometer: As used in this disclosure, a potentiometer is an adjustable electrical device that presents a resistance to a voltage. The level of resistance is adjustable.

Ratchet: As used in this disclosure, a ratchet is a device comprising a pawl or hinged catch that engages the sloping teeth of a wheel or bar permitting motion in one direction only.

Resistor: As used in this disclosure, a resistor is a well-known and commonly available electrical device that inhibits the flow of electricity through an electric circuit. Within an electric circuit processing alternating currents, the resistor will not affect the phase of the alternating current. A current flowing through a resistor will create a voltage across the terminals of the resistor.

Screw: As used in this disclosure, to screw is a verb meaning: 1) to fasten or unfasten (unscrew) a threaded connection; or 2) to attach a helical structure to a solid structure.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Thermostat: As used in this disclosure, a thermostat is a device that monitors the temperature of a space such that the thermostat 1) operates a switch when the measured temperature exceeds or falls below a first preset temperature; and, 2) performs the opposite operation on the switch when the measured temperature falls below or exceeds a second preset temperature.

Threaded Connection: As used in this disclosure, a threaded connection is a type of fastener that is used to join a first tube shaped and a second tube shaped object together. The first tube shaped object is fitted with a first fitting selected from an interior screw thread or an exterior screw thread. The second tube shaped object is fitted with the remaining screw thread. The tube shaped object fitted with the exterior screw thread is placed into the remaining tube shaped object such that: 1) the interior screw thread and the exterior screw thread interconnect; and, 2) when the tube shaped object fitted with the exterior screw thread is rotated the rotational motion is converted into linear motion that moves the tube shaped object fitted with the exterior screw thread either into or out of the remaining tube shaped object. The direction of linear motion is determined by the direction of rotation.

Truncated Cone: As used in this disclosure, a truncated cone is a frustum that remains when the apex of a cone is truncated by a plane that is parallel to the base of the cone.

Tube: As used in this disclosure, a rigid tube is a hollow cylindrical device used for transporting liquids and gases. The line that connects the center of the first base of the cylinder to the center of the second base of the cylinder is referred to as the center axis of the tube or the centerline of the tube. In this disclosure, the terms inner diameter of a tube and outer diameter of a tube are used as they would be used by those skilled in the plumbing arts.

Viscous: As used in this disclosure, a viscous material is a material with a viscosity such that the viscous material has characteristics intermediate between a liquid and a solid.

Viscous Colloid: As used in this disclosure, a viscous colloid is a colloidal suspension where the viscosity or flow rate of the colloid is such that the colloid will flow but can for all practical purposes be treated and contained as if it were a solid. In common usages, a viscous colloid is often referred to as a cream.

Viscous Emulsion: As used in this disclosure, a viscous emulsion is an emulsion where the viscosity or flow rate of the emulsion is such that the emulsion will flow but can for all practical purposes be treated and contained as if it were a gel, cream or solid. In common usages, a viscous emulsion is often referred to as a thick liquid.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An extrusion device comprising:
a piping gun, a heating element, and a thermal control;
wherein the heating element and the thermal control attach to the piping gun;
wherein the extrusion device is a configured for use with a viscous foodstuff;
wherein the extrusion device extrudes the viscous foodstuff;
wherein the extrusion device is a temperature controlled device;
wherein the extrusion device maintains the viscous foodstuff at a previously determined temperature during the extrusion of the viscous foodstuff;
wherein the piping gun contains and extrudes the viscous foodstuff;
wherein the heating element heats the viscous foodstuff contained within the piping gun;
wherein the thermal control controls the temperature of the viscous foodstuff;
wherein the piping gun is a mechanical extrusion device;
wherein the piping gun stores the viscous foodstuff;
wherein the piping gun drives the viscous foodstuff through a nozzle;
wherein the thermal control is an electrical circuit;
wherein the thermal control measures the temperature of the viscous foodstuff;
wherein the thermal control energizes and de-energizes the heating element;
wherein the thermal control has an adjustable temperature set point;
wherein the piping gun comprises a piping tip, a hopper, and a drive mechanism;
wherein the hopper attaches the piping tip to the drive mechanism;
wherein the piping tip is a hollow truncated cone;
wherein the piping tip is formed with openings in the base and the apex of the truncated cone;
wherein the viscous foodstuff is physically extruded through the piping tip;
wherein the piping tip forms the nozzle of the piping gun;
wherein the piping tip is removably attached to the hopper;
wherein the hopper is a hollow rigid cylindrical tube;
wherein the hopper is a reservoir that stores the viscous foodstuff;
wherein the heating element attaches to the hopper such that the heating element will heat the viscous foodstuff stored within the hopper;
wherein the drive mechanism comprises a plunger, a pawl, a handle, and a pivot point;
wherein the pawl is a lever that moves the plunger through the hopper;
wherein the handle is a grip;
wherein the pivot point attaches the pawl to the handle;
wherein the pivot point is a shaft that attaches the pawl to the handle;
wherein the pivot point forms a center of rotation around which the pawl rotates;
wherein the plunger comprises a drive disk and a ratchet stem;
wherein the ratchet stem attaches to the drive disk;
wherein the drive disk is positioned such that the face of the drive disk is perpendicular to the center axis of the hopper;
wherein the ratchet stem is a shaft that attaches to the surface of the drive disk that is distal from the piping tip;
wherein the center axis of the ratchet stem is aligned with the center of the drive disk and the center axis of the piping tip;
wherein the ratchet stem is a toothed bar upon which the pawl catches;
wherein the movement of the pawl forces the ratchet stem and the drive disk into the hopper;
wherein the heating element is a resistive wire;
wherein the heating element is further defined with an eleventh lead and a twelfth lead.

2. The extrusion device according to claim 1
wherein the thermal control comprises a thermostat, a set point circuit, and a power source;
wherein the thermostat, the set point circuit and the power source are electrically interconnected.

3. The extrusion device according to claim 2
wherein the thermostat comprises a thermostat switch, a feedback circuit, and a temperature sensor;
wherein the temperature sensor, the feedback sensor, and the thermostat switch are electrically connected;
wherein the thermostat switch is further defined with a fifth lead and a sixth lead;
wherein the thermostat switch is an electrical switch that is controlled by the thermostat;
wherein the thermostat switch controls the flow of electricity through the heating element;
wherein the feedback circuit is an electrical circuit contained within the thermostat;
wherein the temperature sensor measures the temperature of the viscous foodstuff.

4. The extrusion device according to claim 3
wherein the set point circuit provides a reference voltage that provides the thermostat with the targeted temperature for the viscous foodstuff;
wherein the set point circuit comprises a first resistor, a second resistor, a selection switch, and a master switch;
wherein the first resistor, the second resistor, the selection switch, and the master switch are electrically interconnected;
wherein the first resistor is further defined with a first lead and a second lead;
wherein the second resistor is further defined with a third lead and a fourth lead;

wherein the selection switch is further defined with a seventh lead and an eighth lead;
wherein the master switch is further defined with a ninth lead and a tenth lead;
wherein the feedback circuit compares the temperature of the viscous foodstuff to a target temperature indicated by the set point circuit;
wherein the first resistor is a two terminal electrical device;
wherein the second resistor is two terminal electrical device;
wherein the first resistor and the second resistor combine to form an electrical circuit configuration known as a voltage divider;
wherein the set point voltage generated by the feedback circuit is measured at the electrical connection of the first resistor and the second resistor;
wherein the selection switch is a maintained switch that is wired in parallel to the first resistor;
wherein the set point voltage generated by the set point circuit is changed using the selection switch;
wherein the master switch is a maintained switch placed in series between the power source and both the thermostat and the set point circuit.

5. The extrusion device according to claim 4
wherein the extrusion device is configured for use in melting and piping chocolate;
wherein the temperature set points of the set point circuit are selected such that the chocolate will reach a temperature selected from the group consisting of a temperature that allows the chocolate to maintain its temper and a temperature that allows the chocolate to lose its temper.

6. The extrusion device according to claim 5
wherein the piping gun further comprises a threaded connection;
wherein the threaded connection comprises an exterior screw thread and an interior screw thread;
wherein the exterior screw thread is a hollow cylindrical structure further formed with an exterior screw thread;
wherein the exterior screw thread attaches the base of the piping tip;
wherein the interior screw thread is formed on the interior surface of the hopper that is proximal to the piping tip;
wherein the exterior screw thread is sized to fit into the interior screw thread.

7. The extrusion device according to claim 6
wherein the power source electrically connects to the ninth lead of the master switch;
wherein the tenth lead of the master switch electrically connects to the fifth lead of the thermostat switch;
wherein the tenth lead of the master switch electrically connects to the seventh lead of the selection switch;
wherein the tenth lead of the master switch electrically connects to the first lead of the first resistor;
wherein the second lead of the first resistor electrically connects to the feedback circuit;
wherein the voltage level at the second lead provides the set point voltage to the feedback circuit;
wherein the second lead of the first resistor electrically connects to the third lead of the second resistor;
wherein the eighth lead of the selection switch electrically connects to the third lead of the second resistor;
wherein the sixth lead of the thermostat switch electrically connects to the eleventh lead of the heating element;
wherein the fourth lead of the second resistor electrically connects to the power source;
wherein the twelfth lead of the heating element electrically connects to the power source.

8. The extrusion device according to claim 7
wherein the thermal control resides within the handle;
wherein the exterior screw thread attaches to the base of the truncated cone that forms the piping tip;
wherein the piping tip attaches to the hopper by screwing the exterior screw thread into the interior screw thread to form the threaded connection.

* * * * *